United States Patent

Eischen

[15] 3,638,879

[45] Feb. 1, 1972

[54] TAPE RECORDER THREADING CONTROL

[72] Inventor: Albert L. Eischen, Arlington Heights, Ill.

[73] Assignee: Warwick Electronics Inc.

[22] Filed: Feb. 24, 1969

[21] Appl. No.: 801,702

[52] U.S. Cl. .......... 242/192, 242/195, 242/197, 242/210

[51] Int. Cl. .......... G11b 15/32, G11b 15/66

[58] Field of Search .......... 242/192, 195, 197, 198, 201, 242/202, 203, 204, 210, 208, 207, 206, 189, 71.1, 71.2, 74

[56] References Cited

UNITED STATES PATENTS

| | | | |
|---|---|---|---|
| 2,891,736 | 6/1959 | Blaes | 242/192 |
| 3,379,387 | 4/1968 | Takahashi et al. | 242/195 |
| 3,429,518 | 2/1969 | McKee | 242/192 X |

*Primary Examiner*—George F. Mautz
*Attorney*—Hofgren, Wegner, Allen, Stellman & McCord

[57] ABSTRACT

Mechanism for effectively braking, or retarding, a tape supply reel, such as in a tape supply cartridge, to prevent tearing or deformation of the tape as may be caused in an automatic threading operation where the end portion of the tape is dereeled, indiscriminately bunched up, or otherwise undesirably loose in the cartridge. The retarding operation is effected herein as a concomitant of the self-threading operation. A portion of the mechanism for effecting the self-threading operation also functions to effectively positively operate the retarding means to assure concurrent self-threading and supply reel retardation and to provide an improved initial feed of the tape in the self-threading operation. A connecting link is provided which is pivotally mounted to be responsive to the operation of the self-threading means for actuating the retarding means.

14 Claims, 4 Drawing Figures

Inventor:
Albert L. Eischen
By Hofgren, Wegner,
Allen, Stellman & McCord
Att'ys

TAPE RECORDER THREADING CONTROL

BACKGROUND OF THE INVENTION

1. Field of the Invention

This invention relates to tape recorders and in particular to means for controlling the tape supply reel during a self-threading operation of a tape recorder.

2. Description of the Prior Art

In one conventional form of tape recorder, means are provided for effecting a self-threading of the tape from a supply reel to a takeup reel for avoiding the necessity of the user threading the tape manually to initiate the use thereof. One improved form of self-threading mechanism is shown in copending Williams and Ryan U.S. Pat. application Ser. No. 666,739 filed Sept. 11, 1967 and owned by the assignee hereof. As disclosed in said application, mechanism is provided in the tape recorder for automatically feeding the tape outwardly from the tape supply reel to a tape takeup means which then permits the tape recorder to be operated in the normal fashion with the tape being taken up on the takeup reel as it is withdrawn from the supply reel. The mechanism is arranged to be released automatically when the tape is gripped by the takeup means under the control of a suitable sensing finger.

Further, in certain forms of tape recorders, means are provided for applying a braking force on the supply reel during the normal "play" operation of the tape recorder.

In the known conventional tape recorders, however, improper threading of the tape from the tape supply reel such as in a tape supply cartridge has occurred because of loose, indiscriminately bunched up, or otherwise improperly reeled tape within the cartridge preventing passage of the tape leader from the cartridge in the desired position. Where such incorrect disposition of the leader tape occurs, the tape within the cartridge has often been torn or otherwise deformed during the self-threading operation.

SUMMARY OF THE INVENTION

The present invention comprehends an improved tape recorder supply control eliminating the above-discussed problems of the known tape recorders in a simple and novel manner. More specifically, the invention comprehends the provision of a tape recorder having self-threading means and means for applying a retarding force to the supply reel during the threading of the tape end from the supply reel so as to take up slack and looseness in the tape on the supply reel upon initiation of the self-threading operation. The invention comprehends the provision of a supply reel retarding means which is operated concurrently with the self-threading mechanism and more specifically, comprehends providing common structure for operating both the self-threading means and supply reel retarding means. The supply reel retarding means is caused to be released upon the termination of the self-threading operation.

The mechanism for effecting the improved tape supply control is extremely simple and economical. The operating means includes mechanism for operating both the self-threading means and the means for retardation of the supply reel and specifically includes a linkage means responsive to the actuation of the self-threading mechanism to effect the supply reel retardation.

The supply reel is retarded by means of a friction pad which is selectively moved into engagement with a reacting portion associated with the supply reel to apply a preselected frictional retardation force thereto sufficient to inhibit rotation of the supply reel as the tape leader is drawn from the supply reel, or cartridge, during the self-threading operation.

The invention comprehends the provision of such a coordinated mechanism wherein the retardation means is effectively positively actuated and the self-threading means is resiliently biased against the leader portion of the tape to effect the self-threading operation.

BRIEF DESCRIPTION OF THE DRAWINGS

Other features and advantages of the invention will be apparent from the following description taken in connection with the accompanying drawings wherein.

DESCRIPTION OF THE PREFERRED EMBODIMENT

Figure 1:
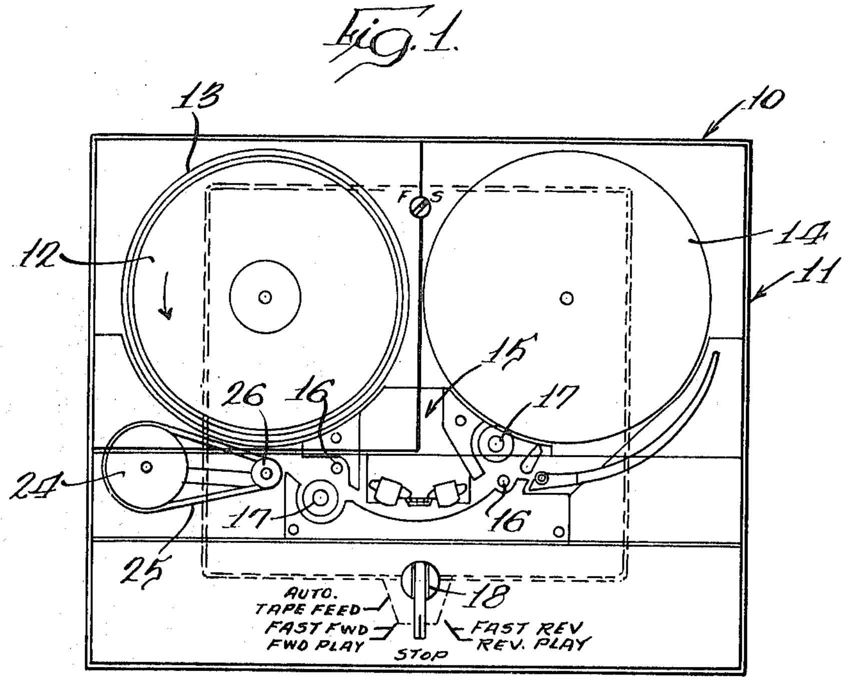
FIG. 1 is a top plan view of a tape recorder provided with new and improved tape supply control means embodying the invention.

In the exemplary embodiment of the invention as disclosed in the drawings, a tape recorder generally designated 10 is shown to include a chassis 11. In FIG. 1, the chassis 11 is shown as having its upper surface horizontal, it being understood that the invention is equally adapted for use with tape recorders installed in a vertical arrangement.

The tape recorder includes suitable mechanism for translating information on a tape 12 to provide an output such as sound. In operation, the tape is drawn from a supply reel 13 and transferred to a takeup reel 14. The information is taken from the tape 12 by a conventional magnetic transducer pickup head structure generally designated 15 as the tape is guided therepast along a preselected path by suitable capstans 16 and pressure rollers 17. A suitable manually operable control knob 18 is provided for selecting the mode of operation of the recorder. Reference may be had to the above indicated Williams and Ryan patent for specific details of the mechanism of the tape recorder mechanism for effecting the various operations of the recorder as controlled by the knob 18.

The present invention is concerned with the control of the tape 12 as it is withdrawn from the supply reel 13 during an automatic self-threading operation wherein the free end, or leader, 19 of the tape 12 is automatically brought from the supply reel 13 along the path past the pickup head structure 15 to the takeup reel 14. As shown in FIG. 1, the control knob 18 is arranged in one control setting to effect this automatic tape feed. In this mode of operation, the tape is fed by means of a feedout mechanism generally designated 20 which automatically strips the tape leader from the tape supply reel 13 and feeds it to suitable tape gripping means (not shown) on the takeup reel 14 permitting the tape recorder to then be operated in the normal "play" mode.

As indicated briefly above, the invention comprehends the further provision of means generally designated 21 for controlling the supply reel 13 so as to take up slack, or looseness, in the tape on the supply reel during the automatic feed operation thereby to avoid damage to the tape such as may occur where the tape is loose, bunched up on the supply reel, etc. More specifically, the invention comprehends providing such slack removal where the tape supply comprises a cartridge-type supply wherein the supply reel 13 is disposed within an outer cartridge housing 22. Tearing and deformation of the tape as a result of loose or bunched up tape within the cartridge has presented a serious problem heretofore, particularly in such cartridge-type tape supplies. The provision of the slack removing means 21 has been found to provide substantially 100 percent cartridge reliability, thus, effectively eliminating this serious problem.

Figure 3:
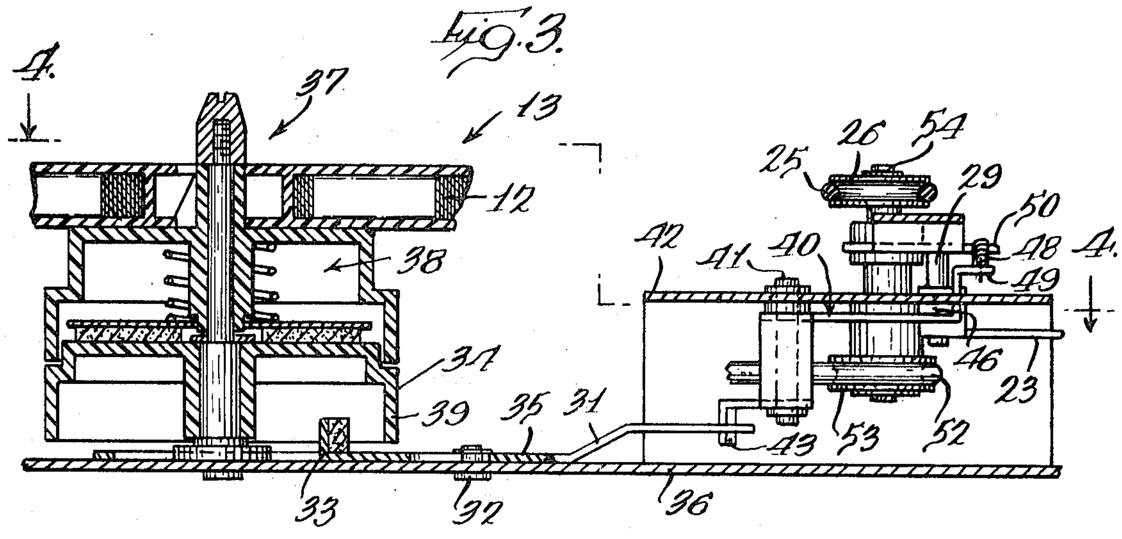
FIG. 3 is a fragmentary vertical section taken substantially along the line 3—3 of FIG. 2.
Figure 2:
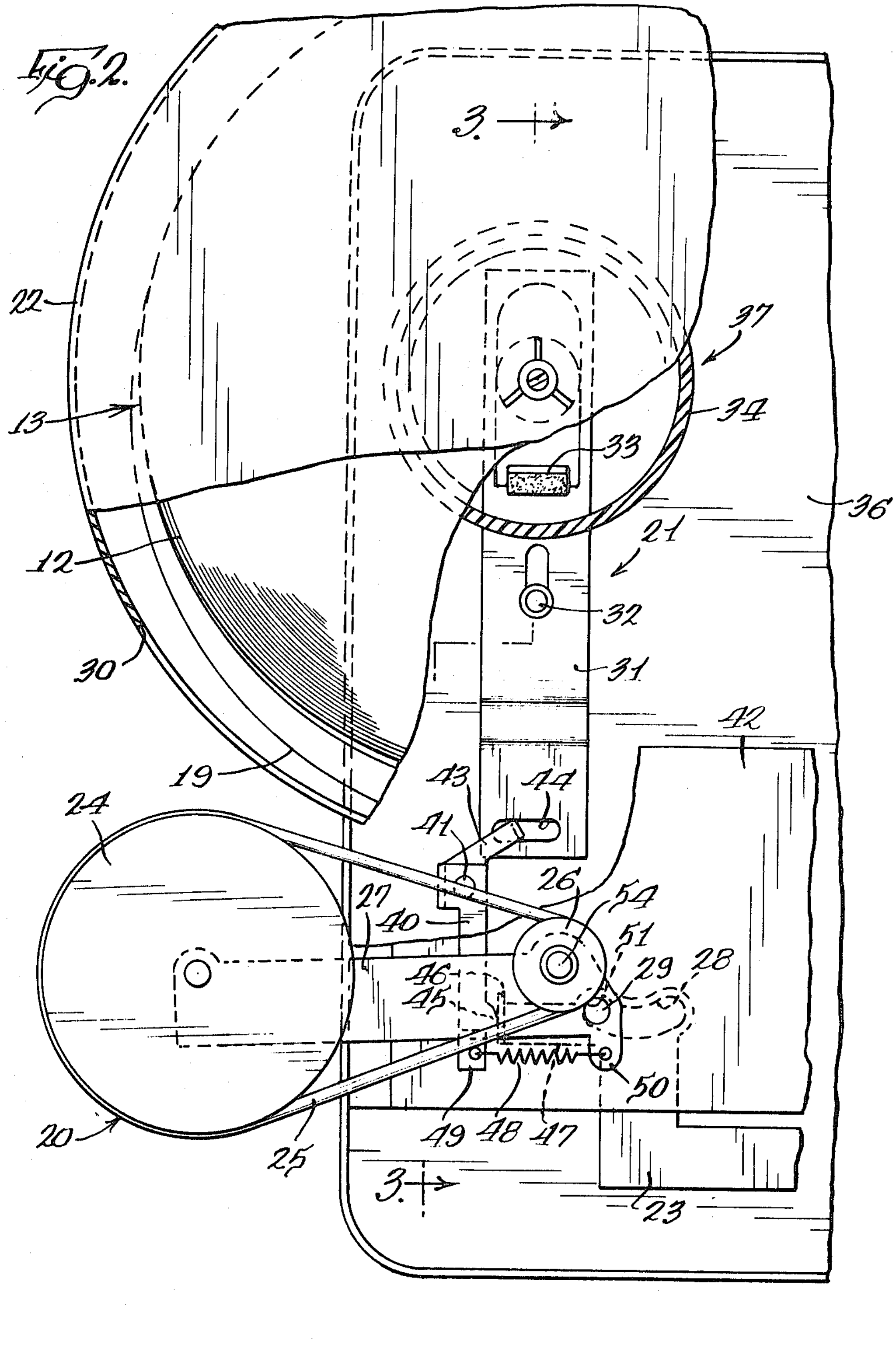
FIG. 2 is a fragmentary enlarged top plan view of the tape supply control means with portions broken away to facilitate illustration of the invention.
Figure 4:
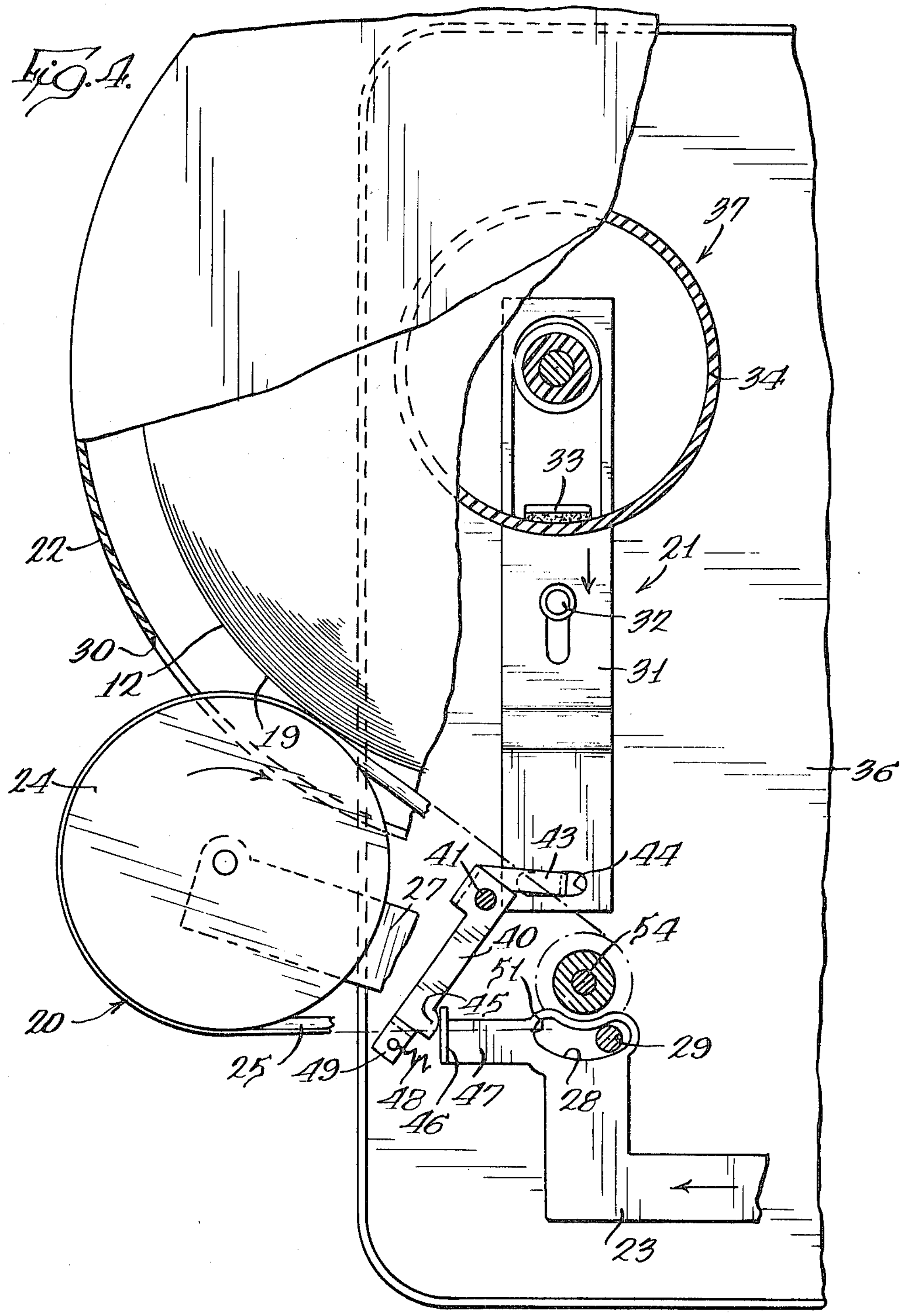
FIG. 4 is a fragmentary top plan view similar to that of FIG. 2 with the supply control means as arranged during the self-threading operation.

More specifically, as shown in FIGS. 2–4, the recorder 10 includes a shifter link 23 arranged to be moved as a function of the operation of control knob 18 from a normal position, as shown in FIG. 2, to a self-threading position as shown in FIG. 4. The feedout mechanism 20 comprises a stripper wheel 24 driven by suitable means, such as a rubber V-belt 25, from a drive pulley 26. The wheel 24 is rotatably carried on an arm 27 which is pivotally mounted on link 23 by means of a pivot post 29 movably received in a slot 28 in link 23. When the stripper wheel 24 is swung to the automatic position of FIG. 4, it enters through a suitable slot 30 in the cartridge housing 22, as shown in FIG. 4, to engage the outer wrap of tape 12 comprising the free end, or leader, 19 of the tape to feed it outwardly through the cartridge opening 30.

As indicated briefly above, the slack-removing means 21 is arranged to be operated concurrently with the operation of the feedout mechanism 20. More specifically, the slack-removing means 21 comprises a drag link carrier 31 slidably mounted on a slide support 32 for reciprocal longitudinal movement. The carrier 31 carries a friction brake pad 33 adapted to engage the hub 34 of the supply reel 13 in the slack removing disposition of FIG. 4. As shown in FIG. 3, the carrier 31 includes a depressed portion 35 riding on a bottom wall 36 which further carries the spindle means generally designated 37 of the supply reel 13. As further shown in FIG. 3, the spindle means 37 may further include a conventional clutch generally designated 38 having a torque transmitting capability of approximately 3 to 6 ounce-inches. As shown, hub 34 is carried on the spindle means 37 and defined by a depending annular reaction portion 39 selectively internally engaged by the brake pad 33 as best seen in FIG. 3.

The movement of carrier 31 is automatically effected as a concomitant of the operation of feedout mechanism 20 by means of a connecting link 40 carried on a pivot 41 supported on an upper mounting plate 42. Link 40 includes a distal downturned end 43 slidably received in a slot 44 in one end of the carrier 31. Link 40 further defines a shoulder portion 45 abutting an upstanding flange 46 on an extension 47 of the link 23. A coil spring 48 is connected between the distal end 49 of the link 40 and a projecting tab portion 50 on the arm 27 tending to pivot the arm 27 in a clockwise direction about the pivot 29 as seen in FIG. 2. However, as shown therein, the pivot 29 is disposed at one end 51 of the slot 28 when the link 23 is other than in the automatic tape feed position. Thus, at this time, as shown in FIG. 2, the brake pad 33 is spaced from the hub 34 and the feedout mechanism 20 is disengaged from the tape reel.

When the control knob 18 is operated to place the recorder in the automatic tape feed operation, link 23 is moved to the position of FIG. 4 thereby moving the slot 28 to the left and thereby permitting the pivot 29 to move away from slot end 51. As shown in FIG. 4, the slot 28 is arcuate to accommodate the swing of the pivot in this movement. At the same time, the upstanding flange 46 on the link extension 47 is moved to the left to swing the connecting link 40 in a clockwise direction about pivot 41 and thereby swing the connecting link end 43 correspondingly in a clockwise direction about pivot 41 to move in slot 44 and draw the carrier 31 longitudinally to engage the brake pad 33 with the supply reel hub 34 and thereby apply a retarding, or braking, force to the supply reel at this time.

The swinging of connecting link 40 in the clockwise direction causes the end 49 thereof to pull the coil spring 48 forcibly therewith and concurrently forcibly urge the tab 50 (FIG. 2) in a clockwise direction to swing the arm 27 in a clockwise direction about pivot 29 and thereby bring the stripper wheel 24 of feedout mechanism 20 into engagement with the tape leader 19.

Resultingly, the automatic tape feed means and supply reel retardation means are actuated concurrently as the result of the movement of link 23 to the automatic tape feed position of FIG. 4 as effected by the manipulation of the control knob 18. The link 23 functions as a common element in the operating mechanism to selectively position the feedout mechanism 20 by the resilient urging of spring 48 and the control of the position of pivot 29 by the selective dispositioning of slot 28, and selectively position the slack removing means 21 by the pivotal movement of the connecting link 40 by the action of flange 46 against shoulder portion 45. The feedout mechanism 20 and slack-removing means 21 are automatically restored to the normal nonoperating position of FIG. 2 by the coil spring 48 when link 23 is moved to the nonoperating position thereof as by manipulation of knob 18 to a selection other than the automatic tape feed load selection.

Thus, when tape recorder 10 is set by knob 18 to initiate an automatic tape feed operation, the stripper wheel 24 engages the leader 19 of the tape 12 in cartridge 22 to move it toward the exit opening 30 and bring the leading end of the tape leader 19 between the tape 12 of the reel 13 and the stripper wheel 24. The leader 19 is then fed from the reel 13 along the path past the transducer pickup head structure 15 to the takeup reel 14 as discussed above. Rotation of the reel 13 does not commence until the slack in the tape 12 on the reel 13 is removed. When the slack is removed, the taut tape causes rotation of the reel 13 by overcoming the frictional resistance exerted by the brake pad 33. The illustrated tape recorder 10 is arranged so that engagement of the leader 19 with the takeup reel 14 automatically terminates the threading operation by suitably moving the link 23 from the operating position of FIG. 4 back to the nonoperating position of FIG. 2 and releases the slack removing means 21. As will be obvious to those skilled in the art, any suitable means may be employed to effect such repositioning, such as the repositioning means disclosed in copending U.S. application for Letters Patent of Williams et al., Ser. No. 666,739, to which application reference may be had for a detailed description of such means.

As will be obvious to those skilled in the art, the control of the self-threading operation effected by feedout mechanism 20 and slack removing means 21 may be adjusted by suitably adjusting the respectively frictional and torque forces generated thereby. More specifically, the frictional force resulting from the action of the stripper wheel 24 against the tape leader 19 under the control of the spring 48 is preselected to be greater than the oppositely acting force on the tape engaged by the stripper wheel resulting from the frictional resistive torque on the hub 34 by the brake pad 33 which, in turn, is greater than the frictional force resulting from the force of the stripper wheel 24 between the layers of tape in the reel 13 resulting from the stripper wheel bias thereagainst. Further, the coefficient of friction between the stripper wheel rubber belt and the tape is preselected to be greater than the coefficient of friction between the base material of the tape and the magnetic oxide. The specific materials of which the brake pad 33, stripper wheel 24 and rubber belt 25 are made may be preselected to provide the desired coordinated control as will be obvious to those skilled in the art. The speed of the stripper wheel 24 and the belt 25 further may be controlled by the drive means therefor, which as shown in FIG. 3 may include a suitably driven belt 52 driving a pulley 53 on a shaft 54 carrying the drive pulley 26.

While I have shown and described one embodiment of my invention, it is capable of many modifications. Changes, therefore, in the construction and arrangement may be made without departing from the spirit and scope of the invention as defined in the appended claims.

I claim:

1. In a tape recorder having tape supply and tape takeup reels, and means for threading tape from the supply reel to the takeup reel including a driver member selectively engageable with the leading end of a tape on the supply reel to withdraw the tape therefrom, threading control means comprising: a brake member operable simultaneously with the driver member for applying a retarding force to the tape which is greater at the trailing end of the tape than at the leading end of the tape whereby said driver and brake members cooperate to remove slack in tape loosely wound on said supply reel prior to rotation of the supply reel.

2. In a tape recorder having tape supply and tape takeup reels, and means for threading tape from the supply reel to the takeup reel including a driver member selectively engageable with the leading end of a tape on the supply reel to withdraw the tape therefrom, threading control means comprising: a brake member operable simultaneously with the driver member for applying a retarding force to the tape which is greater at the trailing end of the tape than at the leading end of the tape whereby said driver and brake members cooperate to remove slack in tape loosely wound on said supply reel prior to rotation of the supply reel, further including means for moving said threading means and brake member to inoperative disposition upon termination of the threading operation.

3. The tape recorder threading control means of claim 2 wherein said last named means comprises linkage means.

4. In a tape recorder having tape supply and tape takeup reels, and means for threading tape from the supply reel to the takeup reel including a driver member selectively engageable with the leading end of a tape on the supply reel to withdraw the tape therefrom, threading control means comprising: a brake member operable simultaneously with the driver member for retarding rotation of the supply reel, said driver and brake members cooperating to remove slack in tape loosely wound on said supply reel prior to rotation of the supply reel, further including reaction means associated with the supply reel for engagement by the brake member for braking the supply reel.

5. The tape recorder threading control means of claim 5 wherein said reaction means comprises a portion of the supply reel.

6. In a tape recorder having means for automatically threading the end of a tape from a supply reel to a takeup reel, brake means for applying a retarding force to the tape which is greater at the trailing end of the tape than at the leading end of the tape, said brake means comprising means for breaking the supply reel during only threading of the tape end, said threading and brake means cooperating to remove slack in tape loosely wound on the supply reel.

7. The tape recorder means of claim 6 wherein said supply reel comprises a cartridge.

8. In a tape recorder having means for automatically threading the end of a tape from a supply reel to a takeup reel, brake means for braking the supply reel during only threading of the tape end, said threading and brake means cooperating to remove slack in tape loosely wound on the supply reel, and common mechanism operating both said threading means and said brake means.

9. In a tape recorder having a supply reel and self-threading means including a manually operable shifter link for actuating the self-threading means, brake means responsive to operation of said shifter link for applying a retarding force to the supply reel, said self-threading and brake means cooperating to remove slack in tape loosely wound on said supply reel upon a withdrawal of the wound tape at the initiation of a threading operation.

10. The tape recorder means of claim 10 wherein the brake means includes a brake pad, a pivotally supported connecting link having one portion connected to said brake pad and a second portion urged by said shifter link for pivoting connecting link to selectively cause the brake pad to apply the retarding force to said supply reel.

11. The tape recorder means of claim 9 further including a driven stripper wheel for advancing tape from said supply reel and means resiliently biasing the stripper wheel selectively into engagement with said tape for effecting a self-threading operation.

12. In a tape recorder having tape supply and takeup reels, a tape threading system therefor comprising:

a feedout member traveling in a direction to fee tape from the supply reel when engaged with the tape;

means mounting said member for movement from a retracted position to a position in engagement with the tape;

a brake element selectively operable to retard rotation of said supply reel; and means including an actuator movable through a fixed distance to positively move the brake element through a fixed distance to a retarding position and yieldingly move said feedout member mounting until the feedout member finds the outer diameter of the tape on the supply reel.

13. The tape recorder means of claim 12 wherein said last named means comprises means for resiliently urging said brake element away from said retarding position as the result of a movement of the actuator to disengage the feedout member from the tape.

14. In a tape recorder having tape supply and tape takeup reels, and means for threading tape from the supply reel to the takeup reel including a driver member selectively engageable with the leading end of a tape on the supply reel to withdraw the tape therefrom, threading control means comprising: slack removal means operable simultaneously with the driver member for retarding rotation of the supply reel and cooperating with the driver member to remove slack in tape loosely wound on said supply reel prior to rotation of the supply reel.

* * * * *